United States Patent
Rood

(10) Patent No.: US 6,641,750 B2
(45) Date of Patent: *Nov. 4, 2003

(54) TREATMENT FOR IMPROVING CELLULOSE INSULATION

(76) Inventor: Leonard D. Rood, 10586 Tropical Breeze La., Boynton Beach, FL (US) 33427

( * ) Notice: Subject to any disclaimer, the term of this patent is extended or adjusted under 35 U.S.C. 154(b) by 0 days.

This patent is subject to a terminal disclaimer.

(21) Appl. No.: 10/340,233

(22) Filed: Jan. 10, 2003

(65) Prior Publication Data

US 2003/0098435 A1 May 29, 2003

Related U.S. Application Data

(63) Continuation-in-part of application No. 10/134,129, filed on Apr. 29, 2002, and a continuation-in-part of application No. 09/939,178, filed on Aug. 24, 2001.

(51) Int. Cl.[7] ............................... E04B 1/74; E04B 1/94
(52) U.S. Cl. ..................... 252/62; 106/18.11; 162/147; 162/159; 252/607; 428/317.9; 428/389; 428/390; 428/535; 428/903.3; 428/920; 428/921
(58) Field of Search ............... 252/62, 607; 106/18.11, 106/164.01, 164.3, 200.1, 204.01, 204.3; 162/147, 159; 428/317.9, 389, 390, 535, 903.3, 920, 921

(56) References Cited

U.S. PATENT DOCUMENTS

| | | | | |
|---|---|---|---|---|
| 4,184,311 A | * | 1/1980 | Rood | .......................... 53/434 |
| 4,468,336 A | | 8/1984 | Smith | .......................... 252/62 |
| 4,645,696 A | * | 2/1987 | Rood | .......................... 252/607 |
| 5,399,375 A | | 3/1995 | Rood | .......................... 427/203 |
| 5,455,065 A | | 10/1995 | Rood | .......................... 427/203 |
| 2003/0039751 A1 | * | 2/2003 | Rood | .......................... 427/212 |
| 2003/0039818 A1 | * | 2/2003 | Rood | .......................... 428/317.9 |

* cited by examiner

*Primary Examiner*—Anthony J. Green
(74) *Attorney, Agent, or Firm*—Frank H. Foster; Kremblas, Foster, Phillips & Pollick

(57) ABSTRACT

An improved fire retardant cellulose insulation with reduced density and reduced settling. A method consists of adding a material, the fibers of which have a positive electrostatic charge, is added onto a shredded newspaper base either before or after the addition of a pre-coat, consisting of a mixture of an inorganic, non-hygroscopic powder and an antistat. A fire retardant agent is then added and the materials are ground in a finish mill. The newspaper fibers become positioned at an angle to the paper pieces, increasing the distance between the paper pieces, thereby lowering the density of the cellulose. Increasing the amount of antistat will decrease settling at the expense of increasing density. Adding water to the insulation system will neutralize static electricity and minimize settling. Fibers such as ground cardboard, wood mulch, sawdust, and fiberglass fibers are examples of materials with electrostatically positively charged fibers.

14 Claims, No Drawings

TREATMENT FOR IMPROVING CELLULOSE INSULATION

CROSS-REFERENCES TO RELATED APPLICATIONS

This application is a continuation-in-part of U.S. Ser. No. 09/939,178, filed Aug. 24, 2001, and U.S. Ser. No. 10/134,129, filed Apr. 29, 2002.

STATEMENT REGARDING FEDERALLY-SPONSORED RESEARCH AND DEVELOPMENT (Not Applicable)

Reference to an appendix"

(Not Applicable)

BACKGROUND OF THE INVENTION

1. Field Of The Invention

This invention relates generally to cellulose insulation of the type utilizing a shredded newspaper base which is treated with a fire retardant chemical composition and used for the thermal insulation of homes and other building structures. More particularly, the invention relates to the addition of a specific range of antistat and electrostatically positively charged fibrous materials to the newspaper base which will lower density and reduce settling of the insulation.

2. Description Of The Related Art

The manufacture of cellulosic insulation, in accordance with the present state of the art, begins with a grinding operation in which newspapers are shredded to a level of approximately 1"×1" pieces and individual fibers. These fibers and paper pieces, carried in air stream, are then ground in a second operation in which finely ground fire retardant chemical is added to the paper and paper pieces.

The key to the understanding of the underlying basis of cellulose insulation is to recognize that cellulose insulation is made up of newspaper pieces and fibers which are affected by static electricity. Like elements will repel; unlike elements will attract. A method of determining the electrostatic charge of a material piece or fiber is to rub the flat side of a nylon toothbrush about 50 times on a piece of wool. Then attempt to attract the material in question with the flat side of the toothbrush. If the material is positively charged, it will attach to the flat part of the toothbrush. If the material is negatively charged, it will not be attracted to the flat base of the toothbrush, but may attach to the edges of the toothbrush. Based on the above system, the face of a newsprint paper piece is positively charged and the edge fibers are negatively charged. The newspaper separate fibers are also negatively charged.

U.S. Pat. No. 4,468,336 refers to an insulation "wherein the loose fill cellulose insulation has a settled density on the order of about 2.5 pounds per cubic foot before mixing with staple fibers, and the mixture of cellulosic insulation with from 2% to 25% by weight staple fibers has a settled density in the order from 2.1 pounds per cubic foot to about 1.1 pounds per cubic foot". Staple fibers were defined as acrylic, polypropylene, acetate etc. These fibers are electrostatically positively charged.

Because the paper pieces were positively charged, the surface of the paper piece attracted negatively charged paper fibers, essentially parallel to the face of the paper piece. This attraction caused the paper piece to become neutrally charged and therefore, no longer statically attractive. Therefore, the positively charged staple fibers attracted most of the remainder of negatively charged paper fibers, forming a phase separate from the paper pieces. This separate phase is not settling stable because this structure is not supported by the paper pieces and vertically oriented fibers attached to the edges of the paper pieces and will condense. It took a large amount of the staple fibers to lower the cellulose density by producing a separate, lower density, paper fiber to positively charged fiber structure.

BRIEF SUMMARY OF THE INVENTION

In an attempt to improve settling and density of cellulose insulation, I determined that there was an advantage to produce a specific type of fiber to paper piece structure. In this structure, use of the inorganic, non-hygroscopic powder and antistat mixture as described in U.S. Pat. Nos. 5,399,375 and 5,455,065 reduces the static charge on the paper pieces and fibers to a level where fire retardant chemical will adhere to both the paper pieces and fibers. The preferred structure is where the fibers are attached to the paper piece at an angle to the face of the paper piece, not parallel to the face of the paper piece. In this preferred structure, there are very little separate fiber to fiber groupings.

Examples of inorganic, non-hygroscopic powders useful in this invention are limestone, zinc oxide and silica. The non-hygroscopic nature of the powder will allow the antistat to be fed accurately and spread uniformly, even if some moisture is present.

Electrostatically, positively charged fibers, such or wood or fiberglass added either before or after the addition of the antistat to the partially ground paper, are attracted to the negative edges of the electrostatically charged paper piece. The attached positively charged fibers then attract the negatively charged paper fibers, producing a reinforced structure which reduces density and settling.

Improvements in density and settling result from the fact that the negative fibers are deposited at an angle to the face of the paper piece. Density and settling will depend on the distance between paper pieces, affected by the level of static electricity in the system. The degree of separation of the paper pieces is dependent upon the amount of antistat used; the more antistat, the less the separation and the higher the density. Water addition also reduces static electricity, lowering settling, but the static electricity level is increased when the water dries. The amount of electrostatically positively charged fibers added will vary with the type of fiber used. The key is that the amount of separate, positively charged fibers relative to negatively charged fiber groupings is held to a minimum.

Additional reduction in settling occurs by increasing the amount of antistat beyond that amount necessary to produce lower density. Ultimate settling stability is achieved by reducing the static charges in the cellulose to the point where the cellulose charges are almost neutral. In achieving this reduction in settling, density is increased slightly because the electrostatic charges keeping the fibers and paper pieces apart are reduced. Lowering in settling can be accomplished by the addition of water to the cellulose prior to application, but the level of settling increases once the water evaporates.

BRIEF DESCRIPTION OF THE SEVERAL VIEWS OF THE DRAWINGS

There are no drawings.

In describing the preferred embodiment of the invention, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The following convention will be used. Newspaper pieces, wood fibers, cardboard fibers, and fiberglass fibers are positively charged. Newspaper fibers and cardboard pieces are negatively charged. The relationship of the positively charged fibers to the negatively charged paper fibers can only be understood by using a high powered microscope.

The amount of wood fiber necessary to reinforce the paper piece/paper fiber structure is in the range of 2% to 8% of the weight of the paper and positive electrostatic fiber input. The amount of fiberglass fiber to reinforce the settling stable structure is in the range of 0.5% to 2% of the paper and positive electrostatic fiber input. The preferred amount of electrostatic positively charged reinforcing fibers is determined by the structure achieved, as seen using a high powered microscope.

To reduce density, the antistatic constituent of the precoat mixture of antistat and finely ground non-hygroscopic powder is preferably on the order of 0.001% to 0.002% by weight of the sum of the paper and positive electrostatic fiber input. The inorganic, non-hygroscopic powder component range is 1% to 2% of the weight of paper and positive electrostatic fiber input. Fibers will attach essentially at an angle to the paper pieces, causing a greater distance between paper pieces and a lower density than would occur if the positive electrostatic fibers were not present. This range of antistat reduces the static charges of the paper pieces and paper fibers so that positively charged fine ground fire retardant chemicals will adhere to the paper pieces and paper fibers.

Since settling reduction is the result of reducing the static charges in the system to almost neutral, settling will decrease by increasing the amount of antistatic constituent to a range of 0.002% to 0.01% by weight of the sum of the paper and positive electrostatic fiber input. Density will increase because the reduced static charges cause the paper pieces to move closer together.

EXAMPLE 1

A trial was made using 95% newspaper and 5% cardboard. The newspaper was ground in a shredder to a size of about 1×1". A precoat mixture was then added to the shredded newspaper, the precoat containing dimethyl distearyl ammonium chloride in the amount of 0.0015% by weight of the sum of the paper and positive electrostatic fiber input, combined with limestone in the amount of 1.5% of the weight of paper and positive electrostatic fiber input. Partially ground cardboard in the amount of 5% of the weight of paper and positive electrostatic fiber input was then added. These materials were fed in an air stream into a finish mill along with 10% of a finely ground fire retardant chemical, based on the total weight of the system.

The initial material had a density of 0.70 LBS/CU.FT. This material was placed in a 12"×12"×6" high cardboard box in an atmosphere of 50% relative humidity and 70 degrees F. for a period of one month. Settling was 9% after one month.

Commercial cellulose, not containing the cardboard or antistat, under the same conditions as above, had an initial density of 1.3 LBS/CU.FT. and settled 16% over the same period.

EXAMPLE 2

A trial was made similar to Example 1 but the cardboard was first combined with the newspaper base before the addition of the limestone antistat mixture. Under conditions similar to Example 1. Settling after 30 days was 10% after one month and initial density was 0.80 LB/CU.FT.

EXAMPLE 3

A trial was made similar to example 2, but the pre-coat contained finely powdered zinc oxide in place of the limestone. This material was placed in a 12"×12"×"6" high box in an atmosphere of 50% relative humidity and 70° F. for a period of one month. The density of the material was 0.78 LB/CU.FT. Settling was 9% after one month.

A trial was made similar to example 2, but the pre-coat contained finely powdered silica. This material was placed in a 12"×12"×6" high box in an atmosphere of 50% relative humidity and 70° F. for a period of one month. The density of the material was 0.73 LB/CU.FT. Settling was 10% after one month.

EXAMPLE 5

A trial was made similar to Example 1 using 5% cardboard but the antistat was increased to 0.004% of the weight of paper and positive electrostatic fiber input. The initial material density increased to 0.80 LBS/CU.FT. This material was placed in a 12"×12"×6" high box in an atmosphere of 50% relative humidity and 70° F. for a period of one month. Settling was 3% after one month.

EXAMPLE 6

A trial was made similar to Example 1 but the antistat was increased to 0.008% of the weight of paper and electrostatic fiber input. The initial material density increased to 0.95 LBS/CU.FT. This material was placed in a 12"×12"×6" high box in an atmosphere of 50% relative humidity and 70 degrees F. for a period of one month. Settling was 4% after one month.

EXAMPLE 7

A trial was made similar to Example 1 but 5% sawdust was substituted for the cardboard. Antistat was added at 0.004% of the weight of paper and electrostatic fiber. The initial material density was 0.80 lbs/cu.ft. This material was placed in a 12"×12"×6" high box in an atmosphere of 50% relative humidity and 70 degrees F. for a period of one month. Settling was 7% after one month.

EXAMPLE 8

A trial was made similar to Example 1 but 2% fiberglass was substituted for the cardboard used in Example 1. Under conditions similar to Example 1, settling after 30 days was 10% and density was 0.75 lb./cu. ft.

EXAMPLE 9

A trial was made similar to Example 1 but 1% polyester fibers were substituted for the cardboard used in Example 1. Under conditions similar to Example 1, settling after 30 days was 8% and density was 0.78 lb/cu. ft.

EXAMPLE 10

A trial was made similar to Example 2 but 1% polyester fibers were substituted for the cardboard used in Example 2.

Under conditions similar to Example 2, settling after 30 days was 10% and density was 0.77 lb/cu. ft.

EXAMPLE 11

A trial was made similar to Example 1, but water was added to the insulation system to a wet density of 1.8 LB/CU.FT. Settling was 2% after one month.

EXAMPLE 12

A trial was made similar to Example 7, but water was added to the insulation system to a wet density of 1.9 LB/CU.FT. Settling was 1% after one month.

A procedure for installing the cellulose insulation of the invention in new construction is to spray cellulose in between the studs using cellulose, wetted with water just before the spray hits the wall. This water addition improves adhesion because it activates starch present in the cellulose and the water helps the wet cellulose stick to the wall surface and itself. The amount of water necessary is critical because, the more water is used the higher the cellulose density and the more cellulose is needed.

Fortunately, because of the use of the cardboard, the cellulose has a density of 1.8 lb/cu.ft wet, which dries to about 1.5 to 1.6 lb/cu.ft. At this level, the cellulose sticks well to the wall, even after it dries. Typical other cellulose has wet densities of 2.8 to 3.0 lb/cu.ft. and dries to 2.3 to 2.6 lb/cu.ft. This difference is extremely significant.

In essence, the water increases density which moves the paper pieces closer together helping the cellulose stick. I have developed a "squeeze" test, which seems to be indicative of what happens. The procedure is: take a handful of the wet cellulose and squeeze it in your hand. Then lightly press on the cellulose with your thumb. If the cellulose does not break up into pieces, it will be suitable in wall spray.

While certain preferred embodiments of the present invention have been disclosed in detail, it is to be understood that various modifications may be adopted without departing from the spirit of the invention or scope of the following claims.

What is claimed is:

1. An improved cellulosic insulation having reduced density and settling and comprising:
   (a) shredded cellulosic fibers and paper pieces which are precoated with a mixture of an inorganic, non-hygroscopic powder and an antistat;
   (b) electrostatically positively charged fibers; and
   (c) fire retardant chemicals which are adhered on said shredded cellulosic fibers, electrostatically positively charged fibers and paper pieces.

2. An insulation in accordance with claim 1 wherein said antistat is a quaternary ammonium compound.

3. An insulation in accordance with claim 1 where the inorganic, non-hygroscopic powder is finely ground limestone.

4. An insulation in accordance with claim 1 where the inorganic, non-hygroscopic powder is finely ground zinc oxide.

5. An insulation in accordance with claim 1 wherein the inorganic, non-hygroscopic powder is finely ground silica.

6. An insulation in accordance with claim 1 wherein said insulation comprises substantially 0.001% to 0.01% by weight of said antistat, based on the weight of cellulosic fibers, paper pieces and electrostatically positively charged fibers.

7. An insulation in accordance with claim 1 and further comprising water to neutralize the static electricity of the components in order to minimize settling.

8. An insulation in accordance with claim 1 wherein said antistat and inorganic, non-hygroscopic powder together comprise substantially 0.8% to 8% of the weight of cellulosic fibers, paper pieces and electrostatically positively charged fibers.

9. An insulation in accordance with claim 1 wherein said electrostatically positively charged fibers comprise fiberglass fibers at a level of substantially 0.5% to 2% of the weight of cellulosic fibers, paper pieces and electrostatically positively charged fibers.

10. An insulation in accordance with claim 1 wherein said electrostatically positively charged fibers comprise woad fibers at a level of substantially 2% to 8% of the weight of cellulosic fibers, paper pieces and electrostatically positively charged fibers.

11. An insulation in accordance with claim 1 wherein the cellulosic fibers are angled predominantly from about 15% to perpendicular to the paper pieces.

12. An insulation in accordance with claim 1 wherein said electrostatically positively charged fibers comprise shredded cardboard at a level of substantially 2% to 8% of the weight of cellulosic fibers, paper pieces and electrostatically positively charged fibers.

13. An insulation in accordance with claim 1 wherein said electrostatically positively charged fibers comprise wood mulch at a level of substantially 2% to 8% of the weight of cellulosic fibers, paper pieces and electrostatically positively charged fibers.

14. An insulation in accordance with claim 1 wherein said electrostatically positively charged fibers are sawdust at a level of substantially 2% to 8% of the weight of cellulosic fibers, paper pieces and electrostatically positively charged fibers.

* * * * *